I. J. RICHARDSON.
Straw Cutter.
No. 3,036.  Patented April 10, 1843.
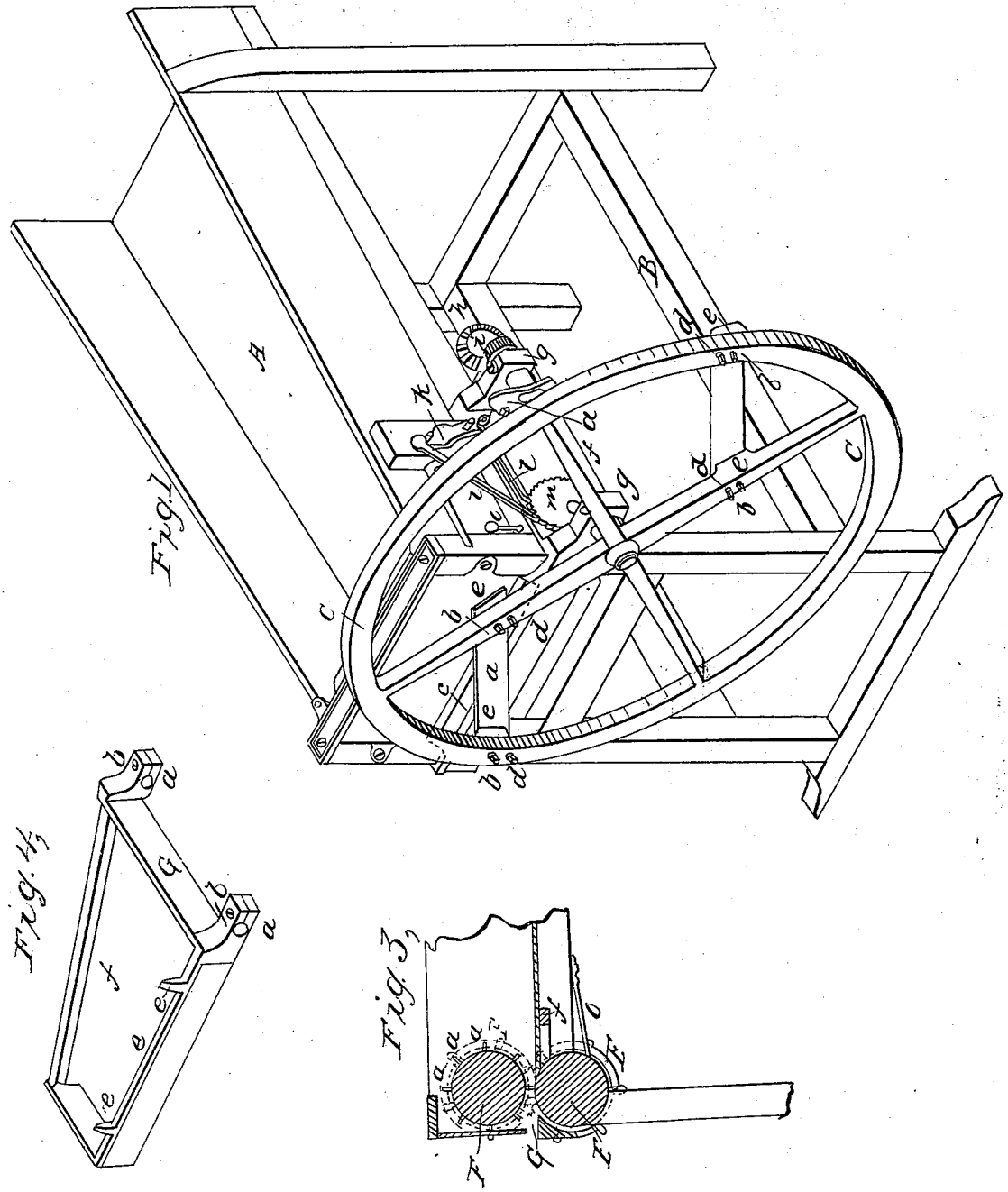

UNITED STATES PATENT OFFICE.

I. J. RICHARDSON, OF NEW YORK, N. Y.

STRAW-CUTTER.

Specification of Letters Patent No. 3,036, dated April 10, 1843.

*To all whom it may concern:*

Be it known that I, ISRAEL J. RICHARDSON, of the city of New York, in the State of New York, have invented a new and useful Machine for Cutting Straw for Feed for Horses or Cattle; and I do declare that the following is a description of the construction and operation of the same, reference being had to the annexed drawings, making a part of this specification.

This machine consists:

1st, of a frame of three feet two inches in height; three feet eight inches in length, and twelve and a half inches in width, having the straw-box at the top of the frame, which is six and a half inches deep, and at the hind end ten and a half inches in width inside and contracts toward the front end to the width of eight and a half inches, and at the front end is closed except the mouth, at which the straw is cut, which is eight and a half inches in length and two inches in width or height.

2nd, of a fly or balance wheel placed at the front end of the straw-box, having attached to it a straight knife, which when the wheel revolves will pass in contact with the mouth of the box, cutting the straw at each revolution of the wheel. The diameter of the wheel is twenty-eight inches. The knife is twelve and a half inches in length and is attached at one end to the rim of the wheel and at the other to one of its arms. The position of the knife upon the wheel may be thus described. Let the outer point of the knife, rest on a line drawn horizontally through the center of the wheel, from thence it extends to a point on the arm so that its edge shall be five inches above or from the center of the wheel, forming an acute angle with the line and an obtuse angle in its connection with the arm, and having its edge downward or toward the center. The knife is ground straight and even on the side next the mouth, and on the opposite, or side next the wheel, with a bevel from the edge one inch in width, and it stands out or is raised from the general surface of the wheel about one inch by projections placed on or forming part of the arm and rim, upon which it rests at the ends, and it is attached by bolts passing through it and to the opposite side of the wheel, which have nuts at their outer or screw ends by which the knife is made fast, the heads of the bolts being sunk in the knife until they are even with its face. The projections upon which the knife rests fall back one inch from the edge, by which means the knife can cut from end to end without being impeded by the projections. A set screw passes through the arm and rim and the projections at the ends of the knife, and comes in contact with the knife between the bolts above mentioned and its edge, by which the knife can with facility and ease, be so adjusted in reference to the mouth of the machine as to cut close and to the best advantage, thereby dispensing with the inconvenient and objectionable method of accomplishing the same object by the use of leather, or wedges of wood or iron, placed under the knife. When the wheel is viewed on the side to which the knife is attached or from the hind end of the machine, it is seen, as its proper position is, on the left hand side of the machine, having its center two inches and a quarter below the bottom of the mouth, and four inches and five-eighths to the left of the mouth. This depression of the wheel or deviation of the mouth above its center, causes a sliding or drawing stroke of the knife while cutting, thereby performing the work of the machine with the exertion of the least possible amount of motive power, and the elevation and distance of the mouth from the center of the wheel prevents the knife from gathering the straw toward the center of the wheel. The wheel revolves, when the machine is in motion, supposing it to be viewed as above, from left to right, cutting the straw with the downward stroke of the knife.

3rd, of two bevel wheels, a large and small, or driver and pinion wheel. The shaft or axis of the larger one passes under the straw box about fifteen inches behind its mouth, having the wheel at the end on the side of the machine next the balance wheel, into which the pinion wheel operates, and which latter wheel is upon the hind end of the balance wheel axis or shaft. On the opposite end of the driving wheel axis is affixed a crank, by the turning of which the balance wheel and the other machinery are put in motion and the cutting of the straw performed. The size of the respective bevel wheels is such, that the balance wheel shall have two or more revolutions to one revolution of the crank, the driver in the machine here described being about five inches and the pinion about two and a quarter inches in diameter, or the former having thirty and the latter twelve cogs, giving two and a half revolutions of the pinion and balance wheels to one of the driving wheel or crank.

4th, of two rollers for propelling the straw toward the mouth of the box or feeding the machine, lying immediately behind and nearly in contact with the mouth, one being placed above the other. The rollers are of the same length of the width of the box at the point where they lie, and each four and a half inches in diameter the upper one having thin ribs of iron let into or fastened to it, extending from end to end, and about one inch and a quarter apart around its circumference, and standing out about one fourth of an inch from its surface. This roller lies within the box as low as the bottom of the mouth, and by means of a small perpendicular opening or slot in each side of the box through which its axis passes, is capable of rising up about two inches, so as to accommodate itself to the quantity of straw that may at any time pass under it. The under roller lies partly below the box and between the side timbers of the frame, the upper side rising as high as the bottom of the mouth of the box, and it is held to its place by its axis resting in boxes or bearings placed in the lower angles formed by the side and front upright timbers of the frame. On the side of the machine upon which the crank above mentioned is placed there are two fingers or long cogged wheels affixed to the axes of the rollers, of such diameter or length of cogs as to operate into each other, whether the rollers be in contact or two inches asunder. On the opposite end of the axis of the lower roller is a fine-toothed ratchet wheel about four and a half inches in diameter. The finger wheels and ratchet wheel operate on the outside of the frame. In order to give the upper roller sufficient pressure upon the straw, both to move it forward and retain it with firmness, a spring is placed below the box on each side, from which a wire passes up, near the ends of the roller, and around its axis, which retain it in connection with the springs and at the same time allow it to rise freely as above described.

5th, of a cam or irregular rimmed wheel attached to the axis of the balance wheel, and which also forms the axis of the cam, with which is connected a small upright shaft or working beam and an arm or hand extending to and operating into the ratchet wheel. The cam is formed and may be described thus: Suppose a wheel four inches in diameter and one and a half inches thick. Take a point or place of commencement on one edge of the periphery, and from thence pass round the wheel by a straight line, except observing the curve of the wheel, to a point three fourths of the circumference on the opposite edge, then pass on by a similar line or a continuation of the same line, one fourth of the circumference, to the opposite side from the last mentioned point, which will arrive at the point of setting out. Let these lines, or line, as it is but one, be one fourth or one eighth of an inch in width. Then let the residue of the wheel be cut away, except that part covered by or lying under this line, toward the center as low as the shaft of the balance wheel or leaving sufficient only for a hub, and it presents the form and construction of the cam, being a wheel with an irregular periphery and corresponding sides, and vibrating, when turned, from one side to the other of its original thickness. The cam is placed upon the shaft of the balance wheel between its two bearings about half an inch from the bearing of the pinion wheel, and is cast with or upon the balance wheel shaft, or may be made and cast separately and afterward fitted to its place. The upright shaft or working beam is attached, at its upper end, near the top of the straw box and turns on a pivot, on a line perpendicular from the inner edge of the cam and extends downward as far as the center of the cam, and there by a forked end or claw, embraces the cam in such manner as to allow its edge or rim to revolve freely through it, while at the same time the lower end of the shaft will move back and forth, parallel with the side of the machine, with the vibrations of the cam. Behind the upper end of this shaft is placed a block or projection from the box, to bring it out and sustain it in its proper position and into which the pivot upon which it turns is fastened. From this shaft extends the arm or hand acting upon the ratchet wheel and is connected with the shaft by a pivot on its outer or inner side. Immediately below the hand is placed a small dog, properly arranged, to prevent the ratchet wheel from receding from any point to which it may be advanced or turned. When thus arranged and the cam is turned, by the revolving of the balance wheel and its shaft, the hand, by the vibrations of the upright shaft, will alternately advance and recede turning the ratchet wheel and rollers as it advances and when it recedes the dog will prevent them from receding with it. The cam is so placed upon the shaft of the balance wheel that while the knife is cutting or passing the mouth of the machine, the hand shall recede by the action of the shortest segment or inclined plane of the cam, and that while the knife is passing through the residue of its circle the rollers are made to turn and feed the machine by the action of the longest inclined plane or segment by which means the straw is constantly moved forward and the machine fed while the knife is revolving without cutting, and remains stationary while it is being cut. This contrivance is made to feed with greateer or less rapidity so as to cause the straw to be cut longer or shorter at the pleasure of the operator, by having several pivots on the working beam or upright shaft, placed at different distances from the end, upon any of which the arm extending to the ratchet wheel can be placed, so as to give the requisite sweep for the degree of feeding required.

6th, of a bar of cast iron extending across the front end of the machine, the upper edge of which is of the same height as the top of the under roller or the upper sides of the side timbers of the frame at the bottom of the straw box, and also extending along the side timber of the machine next the balance wheel, backward as far as the bearing of the pinion wheel and also about five inches along the opposite side timber. This bar is about two inches in width or corresponding with the width of the side timbers, and one fourth of an inch in general thickness, and is firmly attached to the frame by screws or bolts, and to give it the greater stability and render it the less liable to yield in any part, a brace or connecting bar may be extended across the machine, uniting the two ends of the bar above described. This connecting bar should pass over and lie upon the tops of the side timbers till within the box where it must turn downward, conforming with the timbers, and be let into the wood in its descent, and thence across under the bottom of the box, forming a support for the bottom. The bearings or boxes in which the pivots or journals of the balance and pinion wheels operate, or the lower halves of those boxes, are formed upon and cast with this bar, the upper halves being cast separate and attached by screws. Three sides of the mouth of the machine, that is the lower and perpendicular sides, are also formed upon and constitute a part of this bar, the upper side being formed of either wood or iron and attached separately to the frame. The extreme outside or outer edges of the mouth project about an eighth of an inch beyond the general surface of the bar in front, and the knife in revolving is made to come in close contact with this projected part of the mouth, without being subject to come in contact with any other part of the bar. The bearings or supports of the balance and pinion wheels, and that part of the mouth where the knife cuts the straw, being thus formed upon and constituting parts of the same bar or frame of iron, which will remain firm and unyielding by the ordinary use or operation of the machine, will at all times insure precision in the stroke of the knife, and however the other parts of the machine may yield or become displaced the accuracy of the stroke and cutting of the knife will remain the same. This is a desideratum, it is believed, hitherto unattained in any straw cutting machine, and without which none can be of value, for the purposes designed, when long or severely used.

If greater speed in cutting should be desired than can conveniently be attained with one knife, an additional one, like the one described and attached in the same manner, may be adapted to the opposite side of the wheel, so as to give two strokes of the knives to one revolution of the wheel. When this is desired, the cam must be formed or divided into two segments or inclined planes of equal length, but in other respects similar to that above described, and the working beam or upright shaft must be supported and turn on a pivot in its center, having an arm like the one above described, extending from each side of the pivot and both arms or hands must act upon the upper side of the ratchet wheel. By this arrangement, when the machine is operated, one hand will advance while the other recedes, and keep up a continued motion of the ratchet wheel and rollers and consequently a uniform and regular feeding of the machine.

The bar above described, extending around the front and sides of the machine, and which may be called the supporting bar, instead of being formed or cast together with the bearings and mouth in one entire piece, may be formed of several parts, but permanently and unyieldingly fastened together by screws or otherwise so as to attain the object desired.

*Explanation of the drawings.*—Figure 1 is an isometrical view of the machine. A B is the frame, showing th straw box at A. C is the balance wheel; exhibiting a view of the knife *a* (lying across the mouth of the machine *c*) attached to the arm and rim, by the bolts and nuts *b b*. The set screws are shown at *d*, *d*, and the projections upon which the knife rests at *e e*. The shaft or axis of the balance wheel is seen at *f* and its bearing at *g*. The bevel wheels are shown at *h i*,—*h* being the driver and *i* the pinion. *k* is the upright shaft or working beam, and *i* the arms or hands working into the ratchet wheel *m*. One of the wires passing to the axis of the upper roller from a spring beneath is seen at *o*, the set on the opposite side being similar. (*a'*) cam on axis of fly wheel.

Fig. 3 is a longitudinal section through the machine showing the rollers E E—the upper roller exhibiting a view of the ribs, each resembling the one *a*. The finger wheels are seen at F, F, a spring to keep the upper roller down it being connected with it by a wire, see *o*, Fig. 1.

Fig. 4 is a section exhibiting a view of the supporting bar G detached and showing the bearings or boxes in which the pivots or journals of the balance wheel shaft rests at $a$ and the upper half of the box $b$ screwed on. The three sides of the mouth which are cast with the bar are shown at $e\ e\ e$. $f$ is a brace cast with the supporting bar.

What I claim as my invention and desire to secure by Letters Patent is—

1. The combination of the knives, and set-screws, with the balance-wheel, in the manner herein described; so that the edge of the knives can be accurately adjusted to the mouth of the machine; and also so that a straight knife is made to cut obliquely across the mouth of the machine in the manner described without gathering the straw to one side.

2. I claim the combination of the cam on the shaft of the balance-wheel, working-beam ($k$) and hand and ratchet-wheel, for feeding; constructed and arranged as above specified.

3. I claim the iron frame (G, $e$, $e$,) constructed as herein described, having the bearings for the shaft of the balance-wheel and the mouth of the machine all in one piece, for the purpose herein set forth.

4. I claim, placing the shaft of the balance or cutting wheel below the mouth of the machine on one side in the manner above described.

ISRAEL J. RICHARDSON.

Witnesses:
J. J. GREENOUGH,
RICHARD KEY WATTS.